(No Model.)
C. LEHMAN.
STOVE PIPE.
No. 372,075. Patented Oct. 25, 1887.
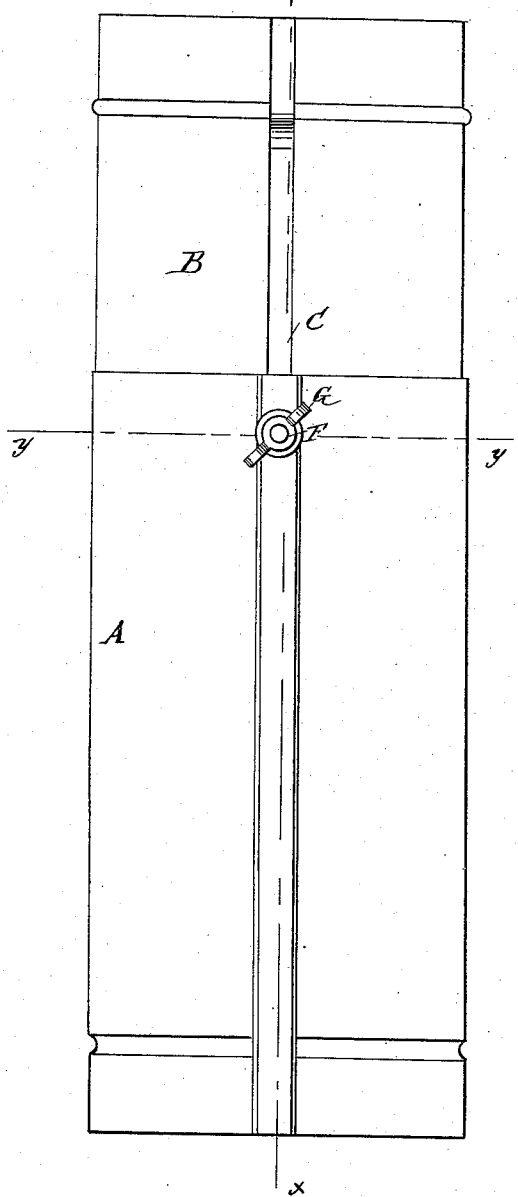
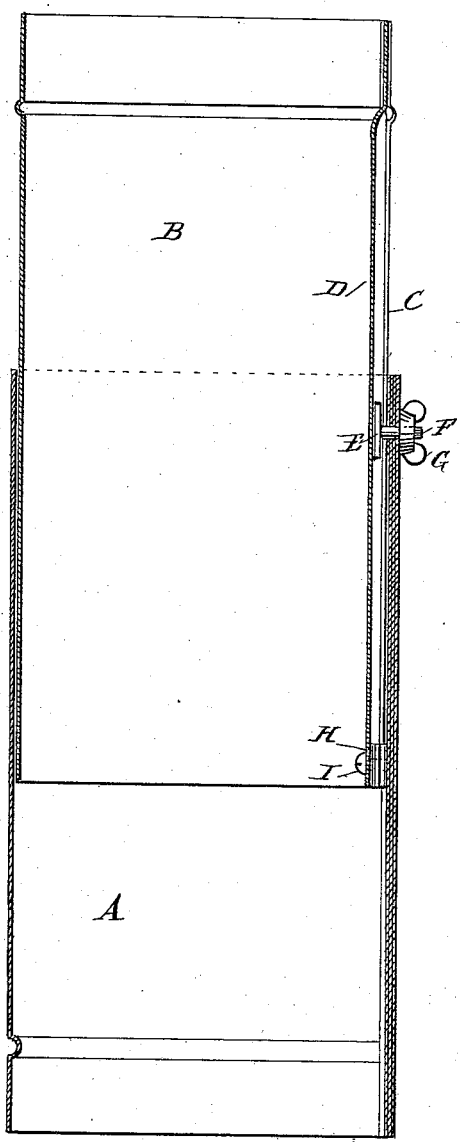
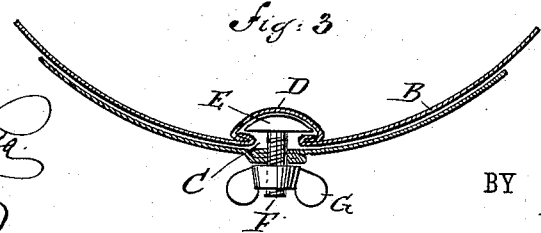
WITNESSES:
INVENTOR:
C. Lehman
BY Munn & Co.
ATTORNEYS.

UNITED STATES PATENT OFFICE.

CHRISTIAN LEHMAN, OF ELGIN, IOWA.

STOVE-PIPE.

SPECIFICATION forming part of Letters Patent No. 372,075, dated October 25, 1887.

Application filed May 18, 1887. Serial No. 238,608. (No model.)

*To all whom it may concern:*

Be it known that I, CHRISTIAN LEHMAN, of Elgin, in the county of Fayette and State of Iowa, have invented a new and Improved Stove-Pipe, of which the following is a full, clear, and exact description.

The object of my invention is to provide a new and improved stove-pipe which can be easily lengthened or shortened and then held in place when adjusted.

The invention consists of two stove-pipe joints telescoping one in the other, of which one is provided with a vertical groove in which is held a bolt extending through the seam of the other joint, said bolt being provided with a nut for fastening the two joints together.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a side elevation of my improvement. Fig. 2 is a vertical cross-section of the same on the line $x\,x$ of Fig. 1, and Fig. 3 is a sectional plan view of my improvement on the line $y\,y$ of Fig. 1.

In the stove-pipe joint A telescopes the stove-pipe joint B, which has its edges connected with each other by the curved piece D, extending on the inside of the joint B and forming a recess in which the head E of the bolt F is held to slide, which bolt F extends outward through the slot C, formed between the edges of the stove-pipe joint B, said bolt F then passing through an aperture in the seam of the stove-pipe joint A to the outside. On the outer threaded portion of the bolt F screws the winged nut G.

The lower end of the recess formed by the connecting-piece D and the lower end of the slot formed between the ends of the stove-pipe joint B, the two forming a groove substantially T-shaped in cross-section, are closed by a stop-piece, H, conforming in shape to the shape of the said groove and being secured to the connecting-piece D by a screw, I, passing through the connecting-piece D and screwing into said stop-piece H. The head E of the bolt F is of a sufficient length to prevent said head from turning in the said groove. The stop-piece prevents the stove-pipe joint B from being drawn out of the stove-pipe joint A, as said stop-piece comes in contact, when the joint B is moved upward, with the head E of the bolt F. The head E presses with its sides against the edges of the stove-pipe joint B, and when the nut G is screwed up against the seam of the stove-pipe joint A then the bolt F, with its head E, clamps the side of the stove-pipe joint B against the stove-pipe joint A near its seam, as shown in Fig. 3.

The stove-pipe joints A and B may be drawn apart or moved in each other when the nut G is unscrewed or loosened, and after the joints A and B have been adjusted to the desired length the nut G is screwed up against the seam of the joint A, so that the head E of the bolt F clamps the joint B to the joint A.

The stop-piece H is put in place after the joint B has been inserted into the joint A, the head E of the bolt F having been previously inserted in the groove of the said joint B. It will be seen that a stove-pipe can be adjusted to any desired length, and at the same time the joints A and B are prevented from turning one in the other.

Having thus fully described my invention, I claim as new and desire to secure by Letters Patent—

1. In a stove-pipe, the combination, with a section of pipe, of a second section telescoping in the said first section and provided with a longitudinal groove substantially T-shaped in cross-section, a bolt having its head fitting in the said groove and projecting through the first section, and a nut on the said bolt, substantially as described.

2. In a stove-pipe, the joint A, the bolt F, held on said joint A, the head E, formed on said bolt F and extending to the inside, and the nut G, screwing on the threaded outer portion of the bolt F, in combination with the joint B and the connecting-piece D, extending between the edges of said joint B and forming a recess for the reception of the bolt-head E, said edges of the stove-pipe joint B forming a slot for the passage of said bolt F, substantially as shown and described.

CHRISTIAN LEHMAN.

Witnesses:
J. C. COOLEY,
E. G. STOEHR.